United States Patent
Swager et al.

(10) Patent No.: US 9,398,096 B2
(45) Date of Patent: Jul. 19, 2016

(54) SYSTEM AND METHOD FOR ACCESSING AN IN-VEHICLE COMMUNICATION NETWORK VIA A MEDIA INTERFACE

(75) Inventors: Jason Swager, San Mateo, CA (US); Eric Jensen, Los Altos, CA (US); Brian Michael Finn, East Palo Alto, CA (US)

(73) Assignees: VOLKSWAGEN AG, Wolfsburg (DE); AUDI AG, Ingolstadt (DE)

(*) Notice: Subject to any disclaimer, the term of this patent is extended or adjusted under 35 U.S.C. 154(b) by 593 days.

(21) Appl. No.: 12/268,291

(22) Filed: Nov. 10, 2008

(65) Prior Publication Data

US 2010/0121939 A1    May 13, 2010

(51) Int. Cl.
*G06F 15/173* (2006.01)
*H04L 29/08* (2006.01)
*H04L 12/40* (2006.01)

(52) U.S. Cl.
CPC ........... *H04L 67/12* (2013.01); *H04L 67/34* (2013.01); *H04L 2012/40273* (2013.01)

(58) Field of Classification Search
USPC ......... 709/223, 217, 218, 219, 220, 224, 225, 709/226, 227, 228, 229
See application file for complete search history.

(56) References Cited

U.S. PATENT DOCUMENTS

| | | | |
|---|---|---|---|
| 6,438,468 B1 * | 8/2002 | Muxlow et al. | 701/3 |
| 6,466,842 B1 * | 10/2002 | Hartsell, Jr. | 700/231 |
| 6,587,756 B2 * | 7/2003 | Moriguchi et al. | 701/1 |
| 7,027,387 B2 * | 4/2006 | Reinold et al. | 370/216 |
| 7,356,389 B2 * | 4/2008 | Holst et al. | 701/3 |
| 7,546,188 B2 * | 6/2009 | Nezu et al. | 701/36 |
| 2006/0049915 A1 | 3/2006 | Deniau et al. | |
| 2007/0063995 A1 * | 3/2007 | Bailey et al. | 345/184 |
| 2008/0167758 A1 * | 7/2008 | Louch et al. | 701/2 |
| 2008/0253317 A1 * | 10/2008 | Gercekci et al. | 370/328 |
| 2008/0261643 A1 * | 10/2008 | Bauer et al. | 455/517 |
| 2009/0067449 A1 * | 3/2009 | Tian | 370/467 |

FOREIGN PATENT DOCUMENTS

| | | |
|---|---|---|
| DE | 101 44 002 | 4/2003 |
| DE | 10 2004 025 886 | 12/2005 |
| DE | 10 2004 027 412 | 12/2005 |
| DE | 10 2004 051 637 | 5/2006 |
| DE | 10 2005 038 462 | 2/2007 |
| DE | 10 2005 043 197 | 3/2007 |

OTHER PUBLICATIONS

"USB Port Makes Driving Entertaining," *Press Box*, May 22, 2007.
"Innovation Day—From Driver Recognition to Teleprogramming," *heise Autos* [retrieved from http://www.heise.de/autos/BMW-Innovationstag-Von-der-Fahrererkennung-bis-zur-Teleprogrammierung--/artikel/s/5423/0], Mar. 14, 2008.

* cited by examiner

*Primary Examiner* — Philip Chea
*Assistant Examiner* — Van Kim T Nguyen
(74) *Attorney, Agent, or Firm* — Kenyon & Kenyon LLP

(57) ABSTRACT

A system and method relate to accessing an in-vehicle communication network, including a media interface having a microprocessor. The media interface may be connected to a vehicle media system. Further, a media device may be connected to the media interface, and the media device may access the in-vehicle communication network via the media interface.

15 Claims, 4 Drawing Sheets

14

```
Connect a media device to an external network
15
           │
           ▼
Retrieve by the media device, from the external network,
update data for a module within an in-vehicle
communication network
16
           │
           ▼
Provide a media interface connected to a vehicle media
system
17
           │
           ▼
Connect the media device to the media interface
18
           │
           ▼
Access all modules within the in-vehicle communication
network via the media interface
19
           │
           ▼
Transmit update data by the microprocessor of the media
interface from the connected media device to the in-
vehicle communication network
20
    ┌──────────────────────────────────────────┐
    │ Retrieve update data by the microprocessor of the
    │ media interface from the connected media device
    │ 21
    │             │
    │             ▼
    │ Identify a module within the in-vehicle
    │ communication network to update
    │ 22
    │             │
    │             ▼
    │ Transmit the update data to the identified module
    │ 23
    └──────────────────────────────────────────┘
```

FIG. 3

SYSTEM AND METHOD FOR ACCESSING AN IN-VEHICLE COMMUNICATION NETWORK VIA A MEDIA INTERFACE

FIELD OF THE INVENTION

The present invention relates to a system and method for accessing an in-vehicle communication network via a media interface.

BACKGROUND INFORMATION

Electrical systems of vehicles originally consisted of a battery, a starter, lighting, and only a few other accessory features. However, vehicles have become increasingly complex over time, especially with regard to the in-vehicle electrical systems. Today, almost every component of a vehicle also includes an electronic control unit (ECU), which is part of the in-vehicle electrical system. Further, all of these components having an ECU also must communicate with one another.

As the complexity of the in-vehicle electrical systems has increased, the potential sources and numbers of errors due to the in-vehicle electrical systems have also increased. Often, these errors require major vehicle recalls in order to fix them. Even in cases in which the complex in-vehicle electrical systems operate error-free, these systems may still require frequent updates in order to maintain compliance and/or compatibility with changing modern standards for the in-vehicle electrical systems.

These updates may be extremely important for aspects of the in-vehicle electrical systems relating to infotainment, for example. In this regard, it may be critical to maintain an updated road map database so that the system has not only a database of current road maps but also a list of current points-of-interest (POI), for example. In addition, it may also be important to maintain an updated multimedia database so that the system has a database of current albums and artists, for example. The databases for these types of infotainment systems may become outdated fairly quickly. For example, databases of road maps, current POI, current albums, and current artists may substantially change between the time of initially loading these databases and the time of actual delivery of the vehicle to a customer. Thus, it may be important to frequently update these and other types of vehicle electrical systems that may become outdated fairly quickly or otherwise require frequent updates.

In addition, consumer electronics media interfaces may also need to be updated frequently in order to stay up-to-date with the latest protocols and standards, for example. In this regard, the consumer electronics device industry generally changes at a relatively fast pace compared to the automotive industry. Thus, similar to databases of current multimedia information, the consumer electronics media interfaces may also become outdated fairly quickly, thereby requiring frequent updates.

However, despite this need for updating and maintaining current information in in-vehicle electrical systems, including, for example, infotainment systems, consumer electronics media interfaces, and many other systems, there is presently no convenient method to interface with all the components of in-vehicle electrical systems. Further, this problem applies not only to updating the information in the in-vehicle electrical systems but also to retrieving the information presently existing in the in-vehicle electrical systems. As a result, it is nearly impossible for vehicle owners to know the current status of components of the in-vehicle electrical systems, unless they are currently using a particular component or happen to recall the most recently updated state of a particular component. Moreover, service intervals for updating components of in-vehicle electrical systems may be infrequent and untimely, and may possibly be based purely upon a vehicle owner's memory, service notations in vehicle manuals, or service stickers occasionally applied to vehicle windows. Thus, components of in-vehicle electrical systems may not receive important updates until after such updates should have been received and incorporated.

Presently, in order to update an in-vehicle electrical system, a vehicle owner may be required to bring his/her vehicle to a vehicle dealer. There, a service technician may need to connect the vehicle to an expensive testing machine in order to determine the present status of the in-vehicle electrical system. After the testing machine scans all components of the in-vehicle electrical system for their present status, the service technician may then proceed to make the necessary repairs and/or updates. This procedure may be both expensive and time-consuming, which is generally unsatisfactory to vehicle owners.

In addition, in order to update databases of current road maps and current POI, map disks or other media storage devices containing the updated information may need to be replaced. However, vehicle owners must first obtain the storage devices containing the updated information. In addition, such storage devices may not necessarily be compatible with existing interfaces in in-vehicle electrical systems. Some interfaces of the in-vehicle electrical systems may be able to be updated in the same manner as other interfaces of the vehicle ECUs. Often, however, interfaces, such as media interfaces, may need to be completely replaced due to incompatibility with current media storage devices.

Further, in order to monitor and update in-vehicle electrical systems, vehicle owners may purchase equipment to retrieve vehicle data via the on-board diagnostic (OBD) connector. However, such equipment may be highly specialized, expensive, and difficult to operate.

German Published Patent Application No. 10 2004 051 637 describes a control device that utilizes a separate, dedicated interface formed as a plug connection in a vehicle dashboard.

German Published Patent Application No. 10 2004 027 412 describes a motor vehicle key that communicates with a vehicle communication system via contactless communication systems, such as infrared and electromagnetic interfaces.

German Published Patent Application No. 10 2004 025 886 describes a motor vehicle key that communicates with a motor vehicle via a wireless interface, such as a radio link, and communicates with a computer via a USB or Firewire interface.

German Published Patent Application No. 10 2005 043 197 describes a dedicated circuit for transmitting personal data via card locations that include interfaces such as USB, Bluetooth, and infrared interfaces.

German Published Patent Application No. 101 44 002 describes an organizer, such as a portable computer, that communicates with a vehicle via an infrared interface.

German Published Patent Application No. 10 2005 038 462 describes a control center that communicates with a vehicle via a communication link using communication protocols such as GSM, Internet minutes, LAN, or WAN.

U.S. Patent Application Publication No. 2006/0049915 describes a remote keyless entry transmitter that connects to a dedicated docking station of a vehicle via, for example, a USB connector.

SUMMARY

Example embodiments of the present invention provide for conveniently accessing components of an in-vehicle electrical system, or an in-vehicle communication network, in order to retrieve information regarding the current status of the network and to provide information to update the network.

Example embodiments of the present invention provide a system and method for accessing an in-vehicle communication network.

According to example embodiments of the present invention, a system for accessing an in-vehicle communication network is provided, which includes a media interface including a microprocessor, in which the media interface is connected to a vehicle media system; and a media device configured to connect to the media interface, via which the media device is configured to access the in-vehicle communication network.

The media interface is connected to the vehicle media system, and is thereby connected to the in-vehicle communication network. The media interface is thus connected in order to transmit data and content to the vehicle media system. Alternatively, the media interface may also be connected directly to the in-vehicle communication network, as well as the vehicle media system.

The media interface, similar to the OBD connector used by specialized equipment or testing machines at a vehicle dealer, can be viewed as another gateway to access the in-vehicle communication network. The media interface may include a microprocessor that interacts with the in-vehicle communication network. Upon connecting the media interface, all components or modules within the in-vehicle communication network may be accessible via the media interface. The media interface may also provide a connection for a media device. Data and content may be brought to the vehicle via the media device.

Upon connecting a media device to the media interface, the microprocessor of the media interface may perform the function of uploading data to the in-vehicle communication network. In this regard, the microprocessor may retrieve update data from the media device, identify the module(s) to be updated with the retrieved data, and transmit the data to the identified module via the in-vehicle communication network. Further, the microprocessor of the media interface may also perform the reverse function of downloading data from the in-vehicle communication network. In this regard, the microprocessor may collect status data from modules of the in-vehicle communication network and store the data on the media device.

The media device may also connect to an external network/device. The media device may transfer data to and/or store data on the external network/device from the in-vehicle communication network. Using the data from the in-vehicle communication network, a vehicle owner may monitor the vehicle data using the external network/device. Alternatively, the media device itself may be used to monitor the vehicle data. In addition, the media device may retrieve data from the external network/device and use such data to update modules of the in-vehicle communication network. An external network/device may include, for example, a computer, a portable device, a data storage device/medium, the Internet, and many others, etc.

The features of a method for accessing an in-vehicle communication network may have similar advantages as the features of the system for accessing an in-vehicle communication network.

According to example embodiments of the present invention, a method for accessing an in-vehicle communication network includes: providing a media interface including a microprocessor, in which the media interface is connected to a vehicle media system; and connecting a media device to the media interface, via which the media device accesses the in-vehicle communication network.

The method may further include accessing all modules within the in-vehicle communication network via the media interface.

The method may further include transmitting data by the microprocessor of the media interface.

The method may further include transmitting update data by the microprocessor of the media interface from the connected media device to the in-vehicle communication network.

The method may further include: retrieving update data by the microprocessor of the media interface from the connected media device; identifying a module within the in-vehicle communication network to update; and transmitting the update data to the identified module.

The method may further include transmitting status data by the microprocessor of the media interface from the in-vehicle communication network to the connected media device.

The method may further include: collecting status data by the microprocessor of the media interface from the in-vehicle communication network; and storing the status data on the connected media device.

The method may further include connecting the media device to an external network.

The method may include retrieving by the media device, from the external network, update data for a module within the in-vehicle communication network.

The method may further include transferring by the media device, to the external network, status data from a module within the in-vehicle communication network.

The system and method for accessing an in-vehicle communication network provide for access and transfer of data to and from a vehicle. A fully integrated media interface allows external media devices to access an in-vehicle communication network. By utilizing such a media interface, accessing an in-vehicle communication network via external media devices may replace the prior methods and arrangements for connecting to an in-vehicle communication network using highly specialized equipment via, for example, the OBD connector.

Automobile manufacturers may continue to increase the number of media interfaces available to vehicle owners in order to provide owners with fully integrated experiences between their vehicles and media devices. As a result, vehicle owners may continue to bring media devices to their vehicles. Such media devices may typically be connected to an external network, from which updates may be retrieved from the Internet, a computer, a portable device, a data storage device/medium, or other sources, etc.

Therefore, by utilizing such media interfaces and media devices, automobile manufacturers may have the ability to better maintain and update modules within the in-vehicle communication network, thereby providing better, possibly safer vehicles. This may also provide better overall experiences to vehicle owners by reducing the number of visits to vehicle dealers for service and in-vehicle communication network maintenance/updates.

Examples of media interfaces connected to in-vehicle communication networks may include the Audi Music Interface (AMI), Volkswagen Media Device Interface (MDI), and other media interfaces. In addition, examples of media devices for transferring data to and from in-vehicle communication networks via media interfaces may include ipods®, SD cards, USB thumb drives, and other media devices.

Example embodiments of the present invention are explained in greater detail in the following text with reference to the appended Figures.

BRIEF DESCRIPTION OF THE DRAWINGS

FIG. 3 is a schematic flow diagram of a method for accessing an in-vehicle communication network to transmit update data from a connected media device.

DETAILED DESCRIPTION

Figure 1:
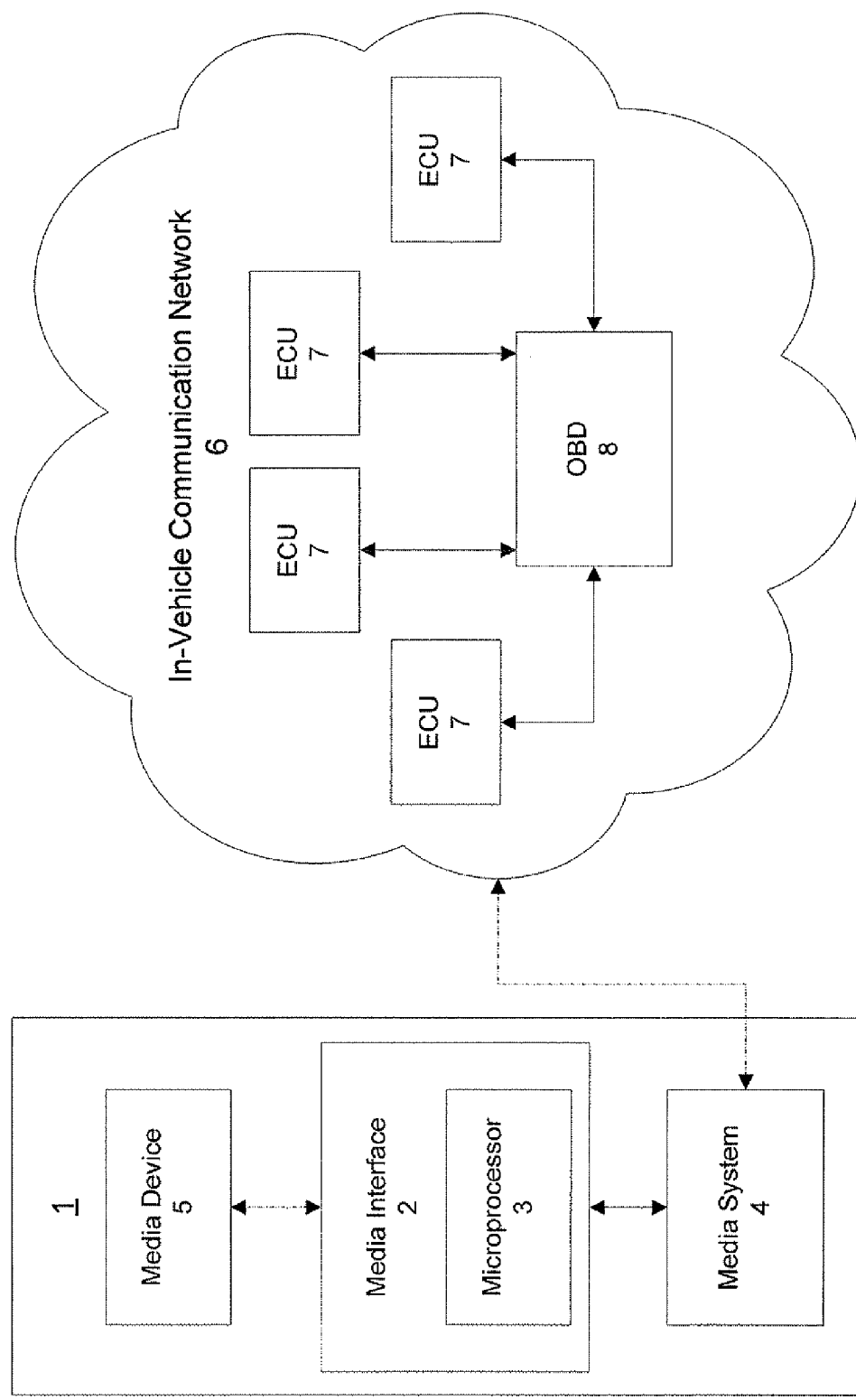
FIG. 1 is a schematic view of a system for accessing an in-vehicle communication network, the system including a media interface having a microprocessor, a media system, and a media device.

FIG. 1 is a schematic view of a system 1 for accessing an in-vehicle communication network 6.

As illustrated in FIG. 1, the system 1 for accessing an in-vehicle communication network 6 includes a media interface 2 having a microprocessor 3, a media system 4, and a media device 5. The in-vehicle communication network 6 may include multiple electronic control units (ECUs) 7, each of which is traditionally connected to an on-board diagnostics (OBD) connector 8.

In the system 1, a media interface 2 having a microprocessor 3 may be connected to a media system 4 of a vehicle. In this manner, the media system 4 may be accessed via the media interface 2, and the microprocessor 3 may transmit data between the media interface 2 and the media system 4 in a bidirectional manner.

Further, a media device 5 may be connected to the media interface 2. Upon connecting the media device 5 to the media interface 2, the microprocessor 3 may transmit data between the media device 5 and the media interface 2 in a bidirectional manner.

Because the media interface 2 may be connected to both the media system 4 and the media device 5 in a bidirectional manner, the microprocessor 3 may transmit data between the media system 4 and the media device 5, also in a bidirectional manner.

Further, the media system 4 may also be connected to an in-vehicle communication network 6 in a bidirectional manner. As described above, the in-vehicle communication network 6 may include multiple electronic control units (ECUs) 7. In this manner, the media system 4 may be connected to each of the multiple ECUs 7 in a bidirectional manner.

Accordingly, the media device 5 may also be connected to each of the multiple ECUs 7 via the media interface 2, media system 4, and the in-vehicle communication network 6, in a bidirectional manner. Therefore, the microprocessor 3 may transmit data between the media device 5 and the multiple ECUs 7, in a bidirectional manner.

As a result, the media device 5 may be used to transmit data to and from each of the multiple ECUs 7 of the in-vehicle communication network 6 by using the media interface 2, instead of using highly specialized equipment to connect to the in-vehicle communication network 6 via the OBD 8.

Because of the bidirectional nature of all the foregoing connections, data may be transmitted from the media device 5 via the media interface 2, the media system 4, and the in-vehicle communication network 6 to one or more ECUs 7, and data may also be transmitted from one or more ECUs 7 via the in-vehicle communication network 6, the media system 4, and the media interface 2 to the media device 5. In this manner, update data can be uploaded to modules 7 of the in-vehicle communication network 6 from a media device 5, and status data can also be downloaded to a media device 5 from modules 7 of the in-vehicle communication network 6.

During the uploading of data to modules 7 from the media device 5, the microprocessor 3 may retrieve the data from the connected media device 5, identify one or more modules 7 to update, and transmit the data to the identified module(s) 7. During the downloading of data to the media device 5 from modules 7, the microprocessor 3 may collect data from one or more modules 7, and store the data on the connected media device 5. Data from modules 7 of the in-vehicle communication network 6 may include, for example, data such as fuel level, fuel consumption, module status, and many others.

Figure 2:
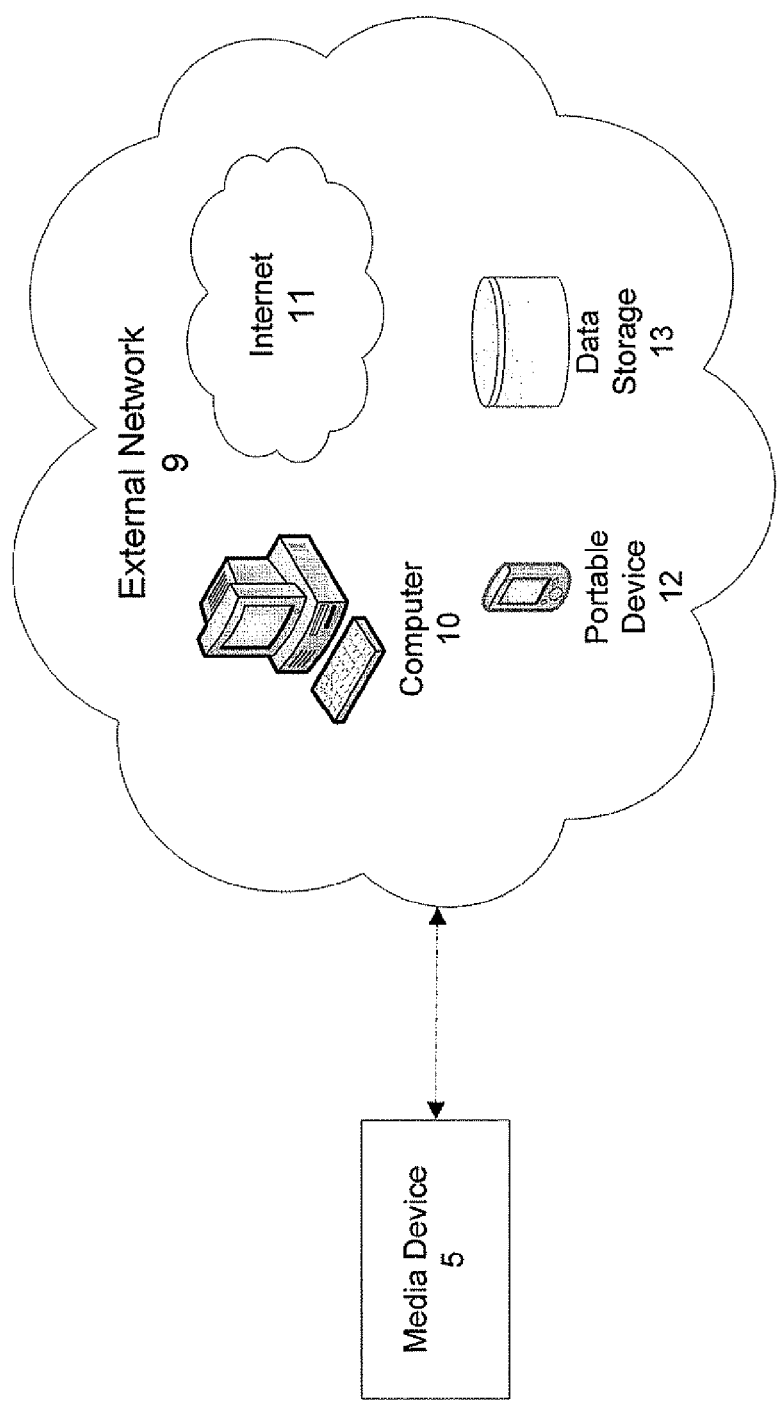
FIG. 2 is a schematic view of a media device connected to an external network.

FIG. 2 is a schematic view of a media device 5 connected to an external network 9.

As illustrated in FIG. 2, a media device 5 may be connected to an external network 9 in a bidirectional manner. The external network 9 may include a computer 10, the Internet 11, a portable device 12, a data storage device/medium 13, others, and combinations thereof.

Because of the bidirectional nature of this connection, data may be transmitted from the media device 5 to the external network 9, and data may also be transmitted from the external network 9 to the media device 5. In this manner, update data intended for one or more modules 7 of the in-vehicle communication network 6 may be uploaded to a media device 5 from an external network 9, and status data from one or more modules 7 of the in-vehicle communication network 6 may also be downloaded to an external network 9 from a media device 5.

Using the external network 9, such as a computer 10, for example, a user may find, retrieve, load, view, select, modify, transfer, or otherwise manipulate data to be uploaded to a media device 5 for updating one or more modules 7 of the in-vehicle communication network 6. In addition, using the external network 9, such as a computer 10, for example, a user may also find, retrieve, load, view, select, modify, transfer, or otherwise manipulate data that has been downloaded to the external network 9 from the media device 5. Alternatively, one or more of these functions may also be carried out on a media device 5 itself, with or without connecting to the external network 9, such as a computer 10, for example.

FIG. 3 is a schematic flow diagram of a method 14 for accessing an in-vehicle communication network 6, to transmit update data from a connected media device 5.

The method 14 as illustrated in FIG. 3 may include the action 15 of connecting a media device 5 to an external network 9. Then, in action 16, the media device 5 may retrieve from the external network 9 update data that is intended for one or more modules 7 within an in-vehicle communication network 6.

Action 17 may provide a media interface 2 having a microprocessor 3 connected to a vehicle media system 4. Then, in action 18, the media device 5 may be connected to the media interface 2. As a result, in action 19, the media device 5 may access all modules 7 within the in-vehicle communication network 6 via the media interface 2.

Then, in action 20, the microprocessor 3 of the media interface 2 may transmit update data from the connected media device 5 to one or more modules 7 within the in-vehicle communication network 6. Action 20 may include actions 21, 22, and 23. In action 21, the microprocessor 3 of the media interface 2 may retrieve update data from the connected media device 5. Then, in action 22, the microprocessor 3 may identify one or more modules 7 within the in-vehicle communication network 6 to update with the update data. In action 23, the microprocessor 3 may transmit the update data to the identified module(s) 7.

By the method illustrated in FIG. 3, one or more modules 7 within in the in-vehicle communication network 6 may be updated with data from a media device 5. In this regard, the update data may be transmitted via a media interface 2, a media device 4, and an in-vehicle communication network 6 by a microprocessor 3 of the media interface 2, as illustrated in FIG. 1. In addition, the media device 5 may retrieve the update data from any of several possible sources, such as an external network 9, as illustrated in FIG. 2.

Figure 4:
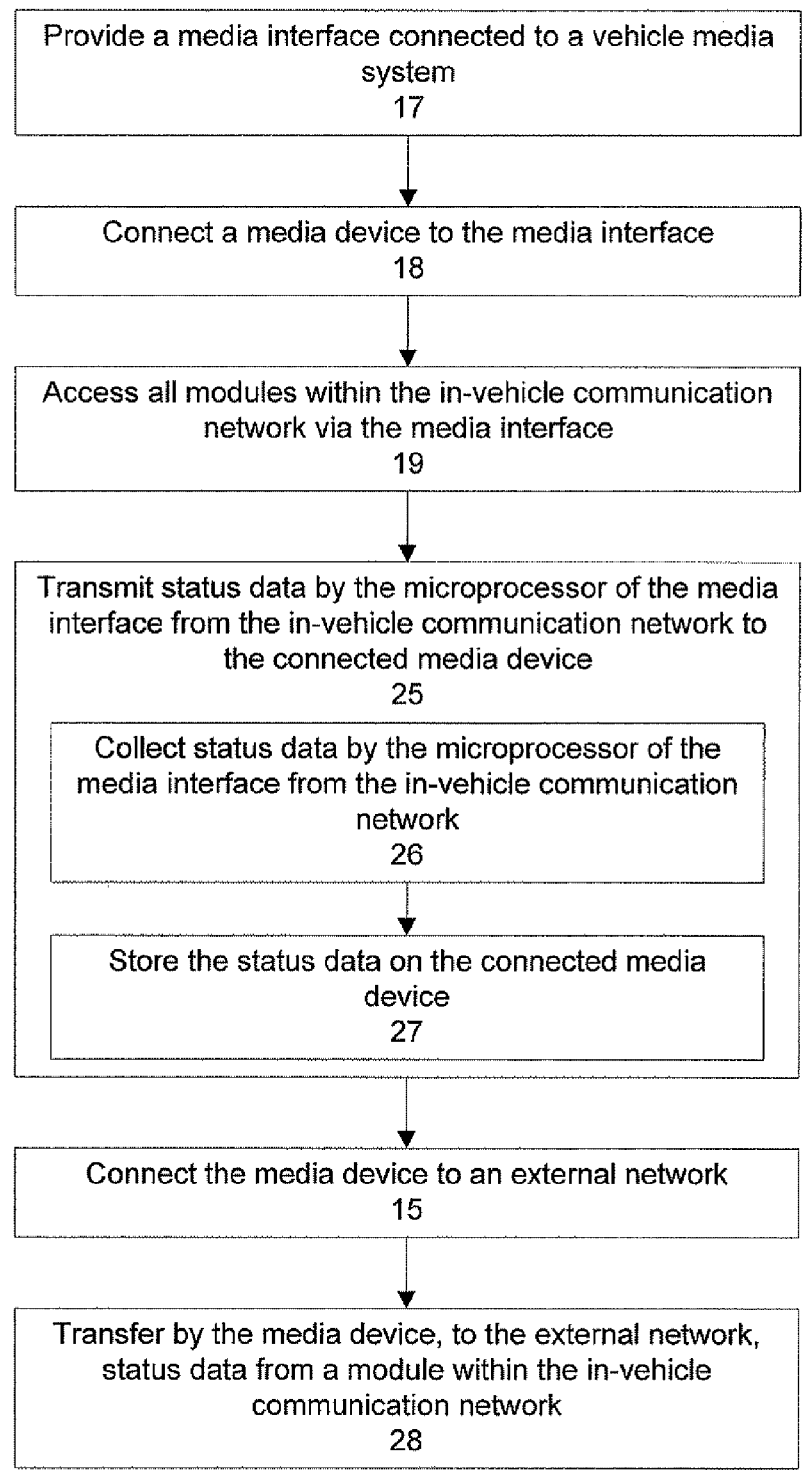
FIG. 4 is a schematic flow diagram of a method for accessing an in-vehicle communication network to transmit status data to a connected media device.

FIG. 4 is a schematic flow diagram of a method 24 for accessing an in-vehicle communication network 6, to transmit status data to a connected media device 5.

The method 24 as illustrated in FIG. 4 may include the action 17 of providing a media interface 2 having a microprocessor 3 connected to a vehicle media system 4. Then, in action 18, a media device 5 may be connected to the media interface 2. As a result, in action 19, the media device 5 may access all modules 7 within the in-vehicle communication network 6 via the media interface 2.

Then, in action 25, the microprocessor 3 of the media interface 2 may transmit status data from one or more modules 7 within the in-vehicle communication network 6 to the connected media device 5. Action 25 may include actions 26 and 27. In action 26, the microprocessor 3 of the media interface 2 may collect status data from one or more modules 7 within the in-vehicle communication network 6. Then, in action 27, the microprocessor 3 may store the status data on the connected media device 5.

In action 15, the media device 5 may be connected to an external network 9. Then, in action 28, the media device 5 may transfer to the external network 9 status data from one or more modules 7 within the in-vehicle communication network 6.

By the method illustrated in FIG. 4, one or more modules 7 within the in-vehicle communication network 6 may transmit their status data to a media device 5. In this regard, the status data may be transmitted via an in-vehicle communication network 6, a media device 4, and a media interface 2 by a microprocessor 3 of the media interface 2, as illustrated in FIG. 1. In addition, the media device 5 may transfer the status data to any of several possible sources, such as an external network 9, as illustrated in FIG. 2.

What is claimed is:

1. A system for accessing an in-vehicle communication network, comprising:
   a media interface including a microprocessor, the media interface connected to a vehicle media system; and
   a multimedia device connected to the media interface and configured to access the in-vehicle communication network via the vehicle media system such that the microprocessor is configured to transmit data bidirectionally between the multimedia device and one or more electronic control units included in the in-vehicle communication network;
   wherein the multimedia device is configured to manipulate the data loaded on the multimedia device;
   wherein the multimedia device is configured to connect to an external network, and to retrieve, from the external network, update data for a module within the in-vehicle communication network;
   wherein the microprocessor of the media interface is configured to transmit the update data from the connected multimedia device to the in-vehicle communication network; and
   wherein the microprocessor of the media interface is configured to retrieve update data from the connected multimedia device, identify a module within the in-vehicle communication network to update, and transmit the update data to the identified module.

2. The system, according to claim 1, wherein all modules within the in-vehicle communication network are accessible via the media interface.

3. The system according to claim 1, wherein the microprocessor of the media interface is configured to transmit status data.

4. The system according to claim 3, wherein the microprocessor of the media interface is configured to transmit status data from the in-vehicle communication network to the connected multimedia device.

5. The system according to claim 4, wherein the microprocessor of the media interface is configured to collect status data from the in-vehicle communication network, and store the status data on the connected multimedia device.

6. The system according to claim 1, wherein the multimedia device is configured to transfer, to the external network, status data from a module within the in-vehicle communication network.

7. The system according to claim 1, wherein each of the one or more electronic control units is connected to an on-board diagnostic connector.

8. The system according to claim 7, wherein the vehicle media system is connected to the electronic control units in the in-vehicle communication network.

9. The system according to claim 1, wherein the media device, media interface, microprocessor, and media system are spatially separate from the in-vehicle communication network.

10. A method for accessing an in-vehicle communication network, comprising:
    connecting a multimedia device to an external network,
    retrieving by the multimedia device, from the external network, update data for a module within the in-vehicle communication network;
    connecting the multimedia device to a media interface including a microprocessor, the media interface connected to a vehicle media system;
    accessing the in-vehicle communication network by the multimedia device via the vehicle media system;
    transmitting data bidirectionally between the multimedia device and one or more electronic control units included in the in-vehicle communication network;
    transmitting the update data by the microprocessor of the media interface from the connected portable multimedia device to the in-vehicle communication network; and
    retrieving update data by the microprocessor of the media interface from the connected multimedia device;
    identifying a module within the in-vehicle communication network to update; and
    transmitting the update data to the identified module;
    wherein the multimedia device is configured to manipulate the data loaded on the multimedia device.

11. The method according to claim 10, wherein all modules within the in-vehicle communication network are accessible via the media interface.

12. The method according to claim 10, further comprising transmitting status data by the microprocessor of the media interface.

13. The method according to claim 12, further comprising transmitting status data by the microprocessor of the media interface from the in-vehicle communication network to the connected multimedia device.

14. The method according to claim 13, further comprising:
    collecting status data by the microprocessor of the media interface from the in-vehicle communication network; and
    storing the status data on the connected multimedia device.

15. The method according to claim 10, further comprising transferring by the multimedia device, to the external network, status data from a module within the in-vehicle communication network.

* * * * *